United States Patent [19]

White et al.

[11] Patent Number: 5,721,051

[45] Date of Patent: Feb. 24, 1998

[54] PROCESS FOR RESIN TRANSFER MOLDING

[75] Inventors: Warren D. White, Lake Jackson, Tex.; Phil H. Cook; Martin Wai, both of Cheshire, Conn.; William Davis, Lake Jackson, Tex.

[73] Assignee: The Dow Chemical Company, Midland, Mich.

[21] Appl. No.: 639,803

[22] Filed: Apr. 22, 1996

Related U.S. Application Data

[60] Continuation of Ser. No. 402,673, Mar. 13, 1995, abandoned, which is a division of Ser. No. 59,153, May 7, 1993, Pat. No. 5,427,725.

[51] Int. Cl.$^6$ .................................................... B32B 27/38
[52] U.S. Cl. ...................... 428/413; 428/408; 428/417; 428/473.5; 428/902
[58] Field of Search ............................. 428/413, 473.5, 428/408, 417, 902

[56] References Cited

U.S. PATENT DOCUMENTS

| | | | |
|---|---|---|---|
| 3,450,594 | 6/1969 | Hennessy | 428/413 |
| 3,922,418 | 11/1975 | Lauchenauer | 428/196 |
| 4,213,930 | 7/1980 | Goodrich et al. | 264/135 |
| 4,325,770 | 4/1982 | Korpman | 156/230 |
| 4,329,387 | 5/1982 | Goodrich et al. | 428/196 |
| 4,496,415 | 1/1985 | Sprengling | 156/283 |
| 4,665,768 | 5/1987 | Scala et al. | 74/609 |
| 4,992,228 | 2/1991 | Heck et al. | 264/135 |
| 5,080,851 | 1/1992 | Flonc et al. | 264/258 |
| 5,176,949 | 1/1993 | Allagnat et al. | 428/198 |
| 5,217,766 | 6/1993 | Flonc et al. | 428/34.5 |

FOREIGN PATENT DOCUMENTS

| | | | |
|---|---|---|---|
| 53-143665 | 12/1978 | Japan | B29D 3/02 |
| 56-163173 | 12/1981 | Japan | C09J 3/14 |
| 59-008374 | 2/1984 | Japan | C09J 3/14 |
| 2158471 | 11/1985 | United Kingdom | A42B 3/00 |

*Primary Examiner*—Leszek Kiliman

[57] ABSTRACT

An improved process to make composites contains the steps of: (1) partially curing a tackifier resin in contact with a substrate to form a shapeable preform; (2) adding a matrix resin and co-curing the tackifier and matrix resin to form a composite. The resulting composites are useful in structural applications.

10 Claims, No Drawings

PROCESS FOR RESIN TRANSFER MOLDING

CROSS-REFERENCE TO RELATED APPLICATION

This is a continuation of application Ser. No. 08/402,637, filed Mar. 13, 1995, now abandoned, which is a divisional of application Ser. No. 08/059,153 filed May 7, 1993 now U.S. Pat. No. 5,427,725.

BACKGROUND OF THE INVENTION

The present invention relates to resin transfer molding processes and preforms useful in those processes.

Resin transfer molding processes are used to make fiber reinforced composite materials. Layers of reinforcing material are loaded into a mold, and a thermosetting resin is injected into the mold and cured by ordinary and accepted procedures to provide a finished composite piece.

It is difficult and time consuming to load different layers of fiber into the mold. It was previously necessary to stitch the fibers together in order to provide net-shaped preforms.

More recently, a thermoplastic-like resin is sometimes used as a "tackifier" to stiffen the reinforcing material and hold it in place before the molding process begins. See Heck et al., U.S. Pat. No. 4,992,228 (Feb. 12, 1991) and Flonc et al., U.S. Pat. No. 5,080,851 (Jan. 14, 1992), which are incorporated herein by reference. ("Thermoplastic-like" means that the resin is a solid, thermosetting resin that exhibits thermoplastic properties, such as a glass-transition temperature and/or a melting point, below the temperature that cures the resin, so that the resin is thermoformable.) In such a process, the individual fiber plies are sprinkled with a solid powder of the tackifier. The powder is heated to fuse it onto the surface of the substrate and then cooled to solidify. The different plies can be stacked together, heated to fuse the plies together, and then cooled leaving a preform. The preform can be placed into the mold and used in an ordinary resin transfer molding process thereafter.

SUMMARY OF THE INVENTION

The known processes have an unrecognized drawback. The tackifier is not completely soluble in the matrix resin used in the resin transfer molding process. The tackifier requires more time to dissolve in the matrix resin than the time required to complete the curing process. As curable resin is pumped into the mold, it transports the undissolved tackifier to one end of the molded product. The resulting composite product contains a matrix resin whose chemical composition is different at one section, from the chemical composition at the other section. The section containing high concentrations of tackifier frequently has poorer physical properties (such as glass-transition temperature) or mechanical properties (such as compression or short beam shear strength) than the section that contains lower proportions of tackifier.

What is needed is an improved process which does not effect the initial dispersion of tackifier throughout the composite product. More preferably, the process gives an even dispersion of tackifier throughout the composite product.

One aspect of the present invention is a process to make a matrix composite comprising the steps of:

(1) contacting a reinforcing substrate with a tackifier, which is a first curable resin or resin composition, at a temperature and for a time sufficient to partially cure the tackifier so that it adheres to the substrate but remains thermoplastic-like and capable of further reaction, whereby a preform is made; and (2) contacting one or more preforms with a matrix resin, which is a second curable resin or resin composition that is capable of reacting with the tackifier, under conditions such that the tackifier and matrix resin are cured, whereby a composite is formed.

A second aspect of the present invention is a preform that comprises:

(1) a reinforcing substrate suitable for use in a matrix composite; and (2) a partially cured tackifier, which is a curable resin or resin composition that adheres to the substrate but is thermoplastic-like and is capable of co-reacting with a matrix resin to form a cured product.

A third aspect of the present invention is an improved method to make composites having the steps of:

(1) contacting a fiber-containing reinforcing substrate with a tackifier, which is a first curable resin or resin composition, at a temperature selected such that the tackifier binds fibers within the substrate together but remains capable of further reaction, whereby a preform is made; and (2) impregnating one or more preforms with a matrix resin, which is a second curable resin or resin composition that is capable of reacting with the tackifier; and (3) curing the tackifier and matrix resin, whereby a composite is formed, comprising the improvement that:

(a) the tackifier contains a labeling moiety that can be quantitatively analyzed after the composite is formed without destroying the composite; and (b) the quantity of labeling moiety is analyzed by nondestructive methods in at least two different points of the composite during or after Step (2).

The process and the preform of the present invention can be used to make reinforced matrix composites. The third aspect of the present invention has the additional advantage that finished composites can be tested for migration of the tackifier without destroying the composite. The composites are useful as structural materials.

DETAILED DESCRIPTION OF THE INVENTION

The present invention uses a reinforcing substrate. Suitable reinforcements are well known and familiar to persons of ordinary skill in the art. See, E. G. Kirk-Othmer, Encyclopedia of Chemical Technology-Supplement, *Composites, High Performance*, at 260–281 (J. Wiley & Sons, 1984), which is incorporated herein by reference. The substrate usually contains fibers, such as quartz, aramid, boron, glass, carbon, or gel-spun polyethylene fibers. The fibers can be unidirectional or multidirectional. They may be in the form of woven or non-woven mats or in the form of random short fibers. Preferably, the substrate is in the form of a woven or non-woven fibrous material.

The substrate is contacted with tackifier under conditions such that the tackifier partially cures and adheres to the fibers. The tackifier preferably contains either: (1) a single resin that is capable of at least partially curing with itself; or (2) a mixture containing resin and hardener that is capable of at least partially curing.

Examples of suitable resins which can cure with themselves include: polyimide and particularly bismaleimide resins, polycyanate ester resins, vinyl ester resins (with suitable initiators and promoters) and benzocyclobutene resins. The most preferred example is 1,1'-MDA bismaleimide resin. Examples of suitable polyimide and bismaleimide resins are described in Stenzenberger, "Recent Advances in Thermosetting Polyimides", *British Polymer Journal* 383-396 (1988), which are incorporated herein by reference. Examples of suitable resins that can cure with themselves include 5250-4RTM BMI resin, and are commercially available.

Examples of suitable resin and hardener mixtures include: (a) a mix of epoxy resin (such as TACTIX® 123 epoxy resin or PR 500™ from 3M) and a known curing agent (such as MILLAMINE™ 5260 curing agent); (b) a mix of polyisocyanate and polyol suitable to make polyurethanes (such as SPECTRIM® MM310); and (c) epoxy-cyanate ester resin systems (such as E-905L resin from BP Chemicals). The mixture of resin and hardener preferably contains an epoxy resin and suitable curing agent and optionally a catalyst.

The epoxy resin is preferably the glycidyl ether of a polyhydric phenol, such as biphenol, bisphenol A, tetrabromobisphenol A, a novolac resin, bis-(hydroxyphenyl) fluorene resin, or the like. It may be either a liquid or a solid epoxy resin. It preferably has an epoxy equivalent weight (EEW) of between about 150 and 700.

The curing agent is preferably an amine, amide, sulfimide, sulfamide, polymercaptan, polyphenol, substituted imidazole, polyacid, polyanhydride, urea, thiourea or sulfonamide. It is more preferably an amine or amide compound, such as dicyanamide. In order to assist in partial curing it may be desirable to use multistage curing agent, such as sulfanilamide or cyanoguanidine. The multistage curing agent may be a single compound or a mixture of compounds that contain two or more reactive moieties that react with the epoxy resin to cure at different temperatures.

Examples of suitable catalysts include primary aliphatic polyamines, tertiary amines, and substituted imidazoles. Suitable catalysts, resins and hardeners are commercially available.

The tackifier should be applied to the substrate in a quantity great enough to hold the fibers in the desired shape and position but small enough to leave the resulting preform porous, so that later the matrix resin can infuse throughout the substrate. The quantity of tackifier is preferably at least about 0.25 weight percent of the substrate, more preferably at least about 1 weight percent, and most preferably at least about 3 weight percent. The quantity of tackifier is preferably no more than about 15 weight percent of the substrate, more preferably no more than about 8 weight percent, and most preferably no more that about 5 weight percent.

The tackifier may be applied by known methods, such as spraying or dipping for liquids or sprinkling or electrostatic application for powders. It is preferably applied substantially evenly across the substrate.

Individual plies of preform may optionally be shaped or laminated together (a thermoforming step) after the tackifier is applied (Step 1) and before the composite is made (Step 2). For instance, multiple plies may be pressed together at a temperature above the glass transition temperature of the tackifier. Likewise, individual preforms or laminates may be molded or shaped at a temperature that is above the glass transition temperature of the tackifier and that does not fully cure the tackifier. The temperature is preferably at least about 40° C. and at most about 100° C. when the tackifier is an epoxy resin. The temperature is preferably at least about 50° C. and at most about 110° C. when the resin is a bismaleimide resin. Examples of shaping and laminating different preforms are described in Heck, U.S. Pat. No. 4,992,228 (Feb. 12, 1991) and Flonc, U.S. Pat. No. 5,080,851 (Jan. 14, 1992), which are incorporated herein by reference.

At some time after the tackifier is applied and before it is molded with the matrix resin, the tackifier is partially cured in contact with the substrate. It should be cured enough so that it adheres to the fiber and so that it solidifies enough to hold the fibers in the desired shape and position. On the other hand, the curing should not be complete. The partially cured tackifier should still be thermoformable and should still be capable of reacting with the matrix resin. The tackifier may be partially cured as a separate step, but it is preferably partially cured during application to the substrate (Step 1) or during the thermoforming step or both.

Curing can be halted at the desired level of curing by at least three different methods. First, a resin composition that contains both resin and a curing agent may contain less than a stoichiometric quantity of curing agent, so that only an incomplete cure is possible. The precise quantities of resin and curing agent vary depending upon the resin and curing agent selected, but can readily be determined by persons of ordinary skill in the art. For instance, when the resin is a difunctional epoxy resin and the curing agent is a diamine, then the ratio of epoxy equivalents to amine equivalents is preferably between 0.5:1 and 0.85:1 or between 1.25:1 and 2:1.

Second, when resin composition contains both resin and a curing agent, the curing agent may be a multistage curing agent. The resin and curing agent are cured at a temperature that will only cause curing on some of the curing agent's active sites. In the second step, the composition may be cured at a higher temperature to cause curing at all of the active sites and completely cure the composition.

Third, even when the tackifier is self-curing or contains stoichiometric ratios of resin and hardener, the time and temperature of the partial cure may be selected to provide the desired level of curing. Again, the optimal time and temperature will vary depending upon the tackifier and the presence or absence of any catalyst within the tackifier. Persons of ordinary skill in the art can readily determine the optimum time and temperature without undue experimentation. For instance, when the tackifier contains bismaleimide resin, it is preferably reacted for between 5 and 120 minutes at a temperature between about 120° C. and about 150° C.

Preferably, the glass transition temperature of the partially cured tackifier is low enough that the preform can be laminated and/or shaped without over-curing the tackifier. A partially cured, thermoplastic-like epoxy tackifier preferably has a glass transition temperature of no more than about 130° C., and more preferably no more than about 80° C. A partially cured, thermoplastic-like bismaleimide tackifier preferably has a glass transition temperature of no more than about 180° C., and more preferably no more than about 120° C. On the other hand, the glass transition temperature is preferably high enough so that the preform can be handled and stored at room temperature. The glass-transition temperature is preferably at least about 40° C., and more preferably at least about 60° C. (Glass-transition temperature can be conveniently measured by differential scanning calorimetry.)

Some partially cured tackifiers may continue to cure slowly at room temperature. Therefore, the preform is preferably used in the next step of the reaction before the tackifier cures significantly more. The tackifier is preferably shelf stable for at least about two weeks, more preferably for at least about a month, and most preferably for at least about three months. (A tackifier is considered shelf-stable when it can still be used as a tackifier to give adequate adhesion and to react with the matrix after a period of time.)

The preform is contacted with a matrix resin that contains a second curable resin or resin composition. The matrix resin should be capable of reacting with the partially cured tackifier in the preform. The matrix resin is not required to be chemically related to the tackifier, as long as it can react with the tackifier. For instance, an epoxy resin tackifier can be used with a cyanate ester matrix resin or vice-versa. However, the matrix resin is preferably chemically related to the tackifier, such as epoxy tackifiers with epoxy matrix resins or bismaleimide tackifiers with bismaleimide matrix resins. Most preferably, the matrix resin and the tackifier are essentially the same or differ primarily in the ratio of resin to curing agent. The matrix resins have the same description and preferred embodiments previously given for tackifiers, except that at least a stoichiometric quantity of curing agent should be used.

The quantity of matrix resin should be sufficient to hold the fibers together, to maintain fiber alignment and, preferably, to transfer loads around broken fibers. It is usually preferable to minimize the quantity of matrix resin in the composite. After curing, the matrix resin and tackifier usually make up at least about 25 volume percent of the composite and most often make up at least about 35 volume percent. The matrix resin and tackifier are preferably no more than about 75 volume percent of the composite, more preferably no more than about 45 volume percent and most preferably no more than about 40 volume percent.

The matrix resin is preferably applied under sufficient pressure to force it throughout the preform, so that the preform is impregnated with resin and voids within the cured composite are minimized. The matrix resin is preferably applied at pressures from a vacuum to 600 psig. There is frequently a pressure drop across the mold, so that pressure at the inlet may be as high as about 400 psig while pressure at the outlet is 50 psig or lower. The cured composite preferably contains no more than about 5 volume percent voids, more preferably no more than about 2 volume percent, and most preferably no more than about 1 volume percent voids.

The matrix resin and tackifier are then subjected to temperature and other conditions suitable to fully cure them. Again, the optimum time and temperature varies widely depending upon the matrix resin and tackifier used, and will be familiar to persons skilled in the art. When the matrix resin and tackifier are common epoxy resins, then the final curing step is preferably at least about 30 to 120 minutes at a temperature of at least about 90° C. to 180° C. However, for some epoxy resins the best curing temperature may be as high as 250° C. or more. When the matrix resin and tackifier are bismaleimide resins, then the final curing step is preferably at least about 60 to 240 minutes at a temperature of at least about 150° C. to 210° C., followed by a post-curing step of 60 to 240 minutes at 175° C. to 230° C. The final curing step is preferably completed in a mold that can provide a composite of the desired shape.

The resulting cured composite can be cooled, finished and used in the ordinary manner for matrix composites.

It is theorized, without intending to be bound, that the dispersion of the tackifier is not significantly disturbed when the matrix resin is injected because the tackifier is bonded to the substrate during the partial curing reaction in Step (1). Preferably, the tackifier is evenly dispersed in Step (1), so that it remains evenly dispersed throughout the molding process.

The effectiveness of this procedure can readily be verified by labeling the tackifier with a chemical label that can quantitatively be detected using nondestructive methods. For instance, a small amount of brominated epoxy resin can be made a part of the tackifier. The bromine in the epoxy resin is a labeling moiety that can be measured quantitatively without destroying the resulting composite part by x-ray fluorescence. The average concentration of tackifier preferably varies across the face of the substrate by no more than about 10 percent, more preferably by no more than about 5 percent and most preferably by no more than about 1 percent.

SPECIFIC EXAMPLES

The following examples are for illustrative purposes only and they should not be taken as limiting the scope of either the specification or the claims. Unless otherwise stated all parts and percentages are by weight.

The following materials are used in the Examples:

Epoxy Resin A—is a diglycidyl ether of bisphenol A having a viscosity of 4400 cps at 25° C. and an epoxy equivalent weight (EEW) of 176 to 183, that is commercially available from The Dow Chemical Company as TACTIX® 123 epoxy resin.

Epoxy Resin E—is a brominated diglycidyl ether of bisphenol A having an EEW of 305 to 355, that is commercially available from The Dow Chemical Company as DER® 542.

Epoxy Resin M—is a fluorene-containing epoxy resin that contains both epoxy and amine functionality, so that it cures without a separate curing agent. It has a viscosity of 110 cps at 155° C. and is commercially available from 3M Company as PR-500 resin.

Bis-A—is epoxy resin grade bisphenol A with an equivalent weight of 114.1 and is commercially available from The Dow Chemical Co.

TBBA—is tetrabromobisphenol A (2,2-bis-(3,5-dibromo-4-hydroxyphenyl)propane) with an equivalent weight of 271.9 that is available from Schenectady Chemical Co.

BMI Resin J is a bismaleimide resin blend having a viscosity of 50 cps at 130° C., that is commercially available from BASF NARMCO as 5250-4RTM.

Catalyst A is a 70 weight percent solution of ethyltriphenyl phosphonium acetate:acetic acid complex.

Catalyst B is the amide of sulfanillic acid (sulfanilamide) with a melting point of 165° C. to 167° C. and is commercially available from Aldrich Chemical.

Catalyst C is 2-ethyl-4-methylimidazole available from Aldrich Chemical.

Hardener A is a cyclohexyldiamine with an amine equivalent weight of 28.5, that is commercially available from Milliken Chemical Co as MILLAMINE™ 5260.

Example 1

Process with Advanced Brominated Epoxy Resin Tackifier

An advanced bromine-containing epoxy resin is made. Epoxy Resin E (500 grams), Bis-A (132 grams), and TBBA (67 grams) are heated under nitrogen atmosphere from ambient temperature to 60° C. without stirring. At 60° C., the viscosity of the reaction mixture is low enough to allow heating from 60° C. to 80° C. with stirring. Catalyst A (0.62 grams, 1100 ppm) is added dropwise to the stirred reaction mixture. Over 45 minutes, the reaction temperature is increased from 80° C. to 150° C. An exotherm occurs around 150° C., and heating is reduced so that the reaction temperature does not exceed 200° C. Stirring is continued at about 190° C. for an additional 45 minutes. The hot reaction product is poured onto a cool, non-stick surface as a layer approximately ¼' thick (6.4 mm).

After the advanced resin cools and solidifies, it is broken into flake form. The flaked advanced resin is ground into a fine powder using a Bantam Mill (Mikro-Pul Corporation) fitted with a 0.013" (0.33 mm) herringbone slit screen. The grinding chamber is cooled to ambient temperature with liquid nitrogen to prevent melting of the resinous compound during the grinding process.

The advanced resin contains 2.84% bromine by weight and has an epoxide equivalent weight of about 746, as measured by titration. Its melting point (endotherm minimum) is 58.4° C. by differential scanning calorimetry (DSC).

The advanced resin is used as a tackifier to make laminated preforms. Eight pieces (plies) of AW370-8H AS4-W carbon fiber reinforcing fabric (Hercules Aerospace) are cut from a bulk roll into squares measuring 8" (203.2 mm) on a side. A mixture containing about 9.3 grams of the advanced epoxy resin, 0.6 grams of Catalyst B and 0.1 grams of Catalyst C is sprinkled on each ply in an even coat at a concentration of about 2% by weight. The plies are placed in a hot-air circulation oven for 1 minute at 200° F. (93° C.) in order to melt the mixture, and adhere it to each ply. The plies are then removed from the oven and allowed to cool to ambient temperature.

The plies are stacked treated side up and heated for about 30 minutes at 250° F. (121° C.) under vacuum of 737 mmHg in a vacuum bagging apparatus, then cooled to room temperature. The resulting preform measures about 0.15 inch in thickness and is quite stiff to the touch. The individual plies are strongly adhered to one another due to the partial reaction of the binder mixture. Experimental peel strength measurements show that the partially cured preform has three times the peel strength of uncured preforms.

The laminated preform is used to make a composite. The laminated preform is placed in a metal cavity mold having dimensions 15"W×20"L×⅛"T (381 mm×508 mm×3.2 mm) when closed. Openings in the mold can be used to pump resin into the mold and allow matter to flow out of the mold. The closed mold is heated to 140° F. (60° C.). A mixture of Epoxy Resin A (1100 grams) and Curing Agent A (192.5 grams, 17.5 phr) at 120° F. (49° C.) is introduced into the mold cavity under 10 psi nitrogen atmosphere. A 70 mL portion of resin is collected from exit valves in the mold. The exit valves are closed and then the pressure on the resin is increased to 60 psi. The mold temperature is increased to 350° F. (177° C.) at 2° C. per minute and held at 350° F. for 30 minutes in order to cure the injected resin mixture. The mold is cooled to 140° F. (60° C.) at 3° C. per minute and then the cured composite is removed.

Example 2

Synthesis of Composite Using Advanced BMI Tackifier Compound

An advanced BMI tackifier is made. BMI Resin J (1000 grams, lot 27821) is weighed into a 2-liter resin kettle. The resin kettle is placed in a hot air circulation oven at 110° C. (230° F.) for approximately one hour in order to lower the viscosity of the resin. The kettle is heated using infrared lamps with stirring, according to the time and temperature set out in Table 1.

TABLE 1

| Time (min.) | Temperature (°C.) | Viscosity of Resin at 150° C. (cps) |
|---|---|---|
| 0 | 78 | — |
| 10 | 99 | — |
| 20 | 125 | — |
| 30 | 140 | — |
| 40 | 140 | <10 |
| 50 | 140 | 30 |
| 60 | 140 | 50 |
| 70 | 140 | 78 |
| 100 | 140 | 242 |
| 120 | 141 | 546 |
| 140 | 139 | 1021 |
| 147 | 141 | 1621 |
| 151 | 140 | 2173 |

The preferred viscosity of the final cooled tackifier product is around 2000 cps when tested at 150° C.

Eight pieces (plies) of AW370-8H AS4-W carbon fiber reinforcing fabric (Hercules Aerospace) are cut from a bulk roll into squares measuring 8" (203.2 mm) on a side. An even coat of the BMI tackifier is sprinkled by hand onto the surface of each of the eight plies at a concentration of 5% by weight. The plies are placed in a hot-air circulation oven for 1 minute at 200° F. (93° C.) in order to melt the BMI compound mixture, and adhere it to each ply. The plies are then removed from the oven and allowed to cool to ambient temperature.

The plies are stacked treated side up and heated for 30 minutes at 280° F. (140° C.) in a vacuum bag apparatus under 737 mmHg vacuum. The oven is turned off and the vacuum bagging apparatus is allowed to cool to ambient temperature while remaining under reduced pressure. The laminated preform measures about 0.15 inch in thickness, and is stiff to the touch. The individual plies are strongly adhered to one another to to the partial reaction of the binder mixture.

The laminated preform is placed in a metal cavity mold having dimensions 15"W×20"L×⅛"T (381 mm×508 mm×3.2 mm) when closed and having inlet and outlet valves. The closed mold is heated to 280° F. (138° C.). BMI Resin J is injected into the mold at 280° F. (138° C.) and 10 psig pressure. Valve E is now opened to introduce the liquid resin into the mold cavity. After a 70 mL portion of resin is collected from the outlets, the outlet valves are closed and the resin pressure is increased to 350 psig. The mold temperature is increased to 375° F. (191° C.) at 2° C. per minute and held at 375° F. for 240 minutes in order to cure the injected resin mixture. The mold is cooled to 140° F. (60° C.) at 3° C. per minute, and the cured composite article is removed.

Example 3

Fabrication of Composite Using a Fluorene-Containing Epoxy Resin Tackifier

Eight pieces (plies) of AW370-8H AS4-W carbon fiber reinforcing fabric (Hercules Aerospace) are cut from a bulk roll into squares measuring 8" (203.2 mm) on a side. A tackifier is made by advancing Epoxy Resin M until its melting point is about 60° C. The tackifier is sprinkled evenly over each ply at a concentration of about 5 weight percent. The plies are placed in a hot-air circulation oven for 1 minute at 200° F. (93° C.) in order to melt the tackifier, and adhere it to each ply. The plies are then removed from the oven and allowed to cool to ambient temperature.

The plies are stacked treated side up and heated for about 30 minutes at 280°–300° F. (121°–150° C.) in a vacuum bagging apparatus under a vacuum of about 737 mmHg, then cooled to room temperature. The resulting laminated preform measures about 0.15 inch in thickness, and is quite stiff to the touch. The individual plies are strongly adhered to one another due to the partial reaction of the binder mixture. Experimental peel strength measurements show that the partially cured preform has three times the peel strength of uncured preforms.

The laminated preform is used to make a composite. The laminated preform is placed in a metal cavity mold having dimensions 15"W×20"L×⅛"T (381 mm×508 mm×3.2 mm) when closed. Openings in the mold can be used to pump resin into the mold and allow matter to flow out of the mold. The closed mold is heated to 280°–300° F. (121°–150° C.). Epoxy Resin M at 310°–300° F. (145°–150° C.) is introduced into the mold cavity under 10 psi nitrogen atmosphere. A 70 mL portion of resin is collected from exit valves in the mold. The exit valves are closed and then the pressure on the resin is increased to 350 psig. The mold temperature is increased to 375° F. (191° C.) at 2° C. per minute and held at 375° F. for 120 minutes in order to cure the injected resin mixture. The mold is cooled to 140° F. (60° C.) at 3° C. per minute and then the cured composite is removed.

What is claimed is:

1. A multi-layer preform for use in a matrix composite, said preform comprising:
   (1) two or more layers of reinforcing substrate; and
   (2) 0.25 to 15 weight percent, based upon the weight of the substrate, of a partially cured thermoplastic-like tackifier in contact with said substrate, said tackifier containing either:
       (a) a single self-curing resin at least partially cured; or
       (b) a mixture of a resin and a hardener, said mixture at least partially cured, said tackifier adhered to the substrate and adhering the substrates together and said tackifier adapted to co-react with a matrix resin which comes in contact with said preform, to form a cured product.

2. The preform of claim 1 wherein the tackifier is a resin that cures without the need for a separate curing agent.

3. The preform of claim 2 wherein the tackifier is a bismaleimide resin.

4. The preform of claim 1 wherein the tackifier contains a curable resin and a hardener.

5. The preform of claim 4 wherein the curable resin in the tackifier is an epoxy resin and the hardener in the tackifier is a curing agent for epoxy resins.

6. The preform of claim 4 wherein the tackifier further contains a catalyst for the reaction between the curable resin and the hardener.

7. The preform of claim 4 wherein the tackifier contains a stoichiometric excess of curable resin.

8. The preform of claim 1 wherein the partially cured tackifier in the preform has a glass-transition temperature between about 30° C. and 180° C.

9. The preform of claim 1 which contains at least about 1 weight percent tackifier, based upon the weight of the substrate.

10. The preform of claim 9 which contains no more than about 8 weight percent tackifier, based upon the weight of the substrate.

* * * * *